(No Model.) 2 Sheets—Sheet 1.
O. PAGAN.
TUBE EXPANDER.
No. 471,678. Patented Mar. 29, 1892.
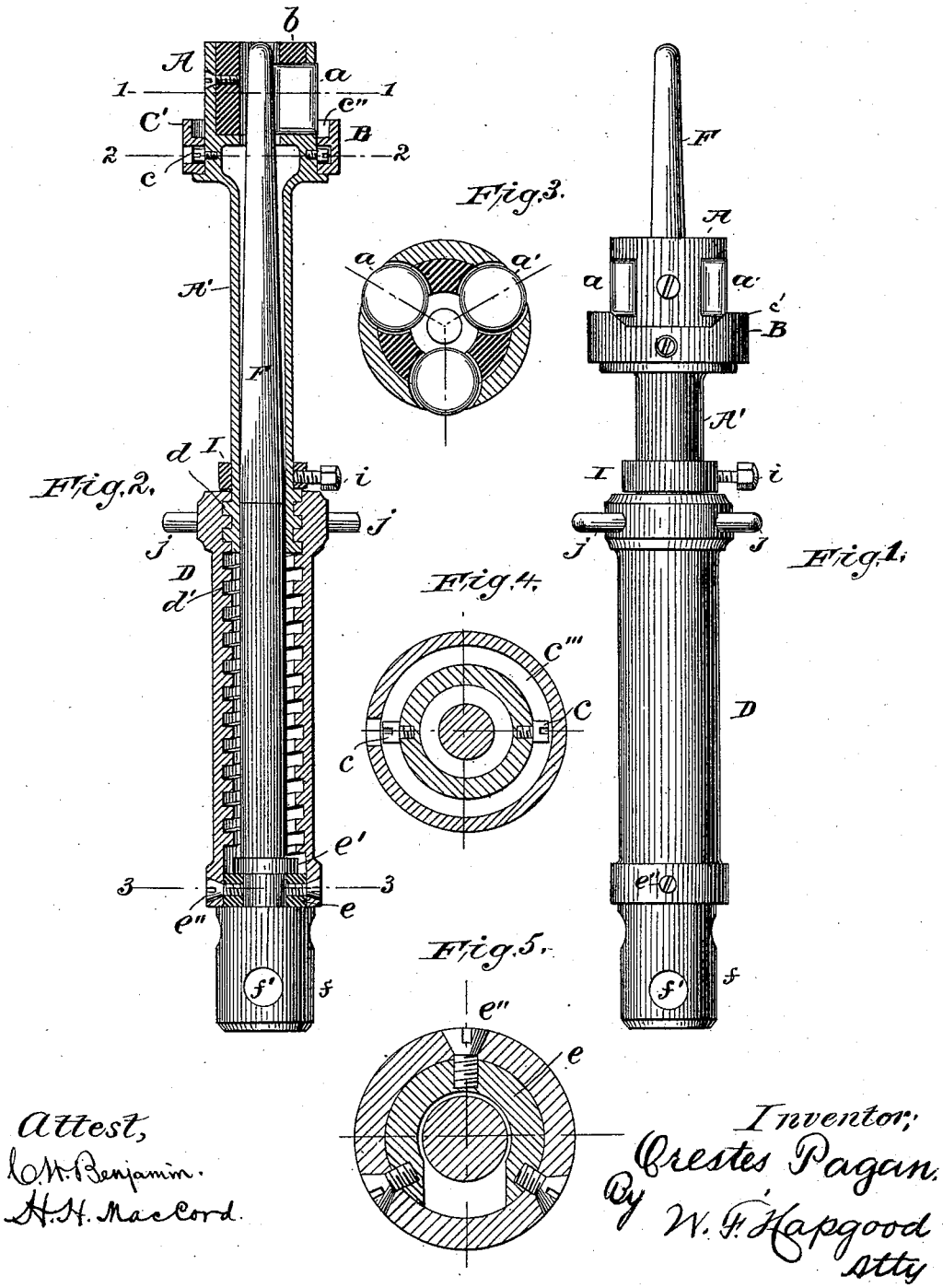
Attest,
C. M. Benjamin.
H. H. MacCord.
Inventor;
Orestes Pagan,
By W. F. Hapgood
Atty (No Model.) 2 Sheets—Sheet 2.
O. PAGAN.
TUBE EXPANDER.
No. 471,678. Patented Mar. 29, 1892.
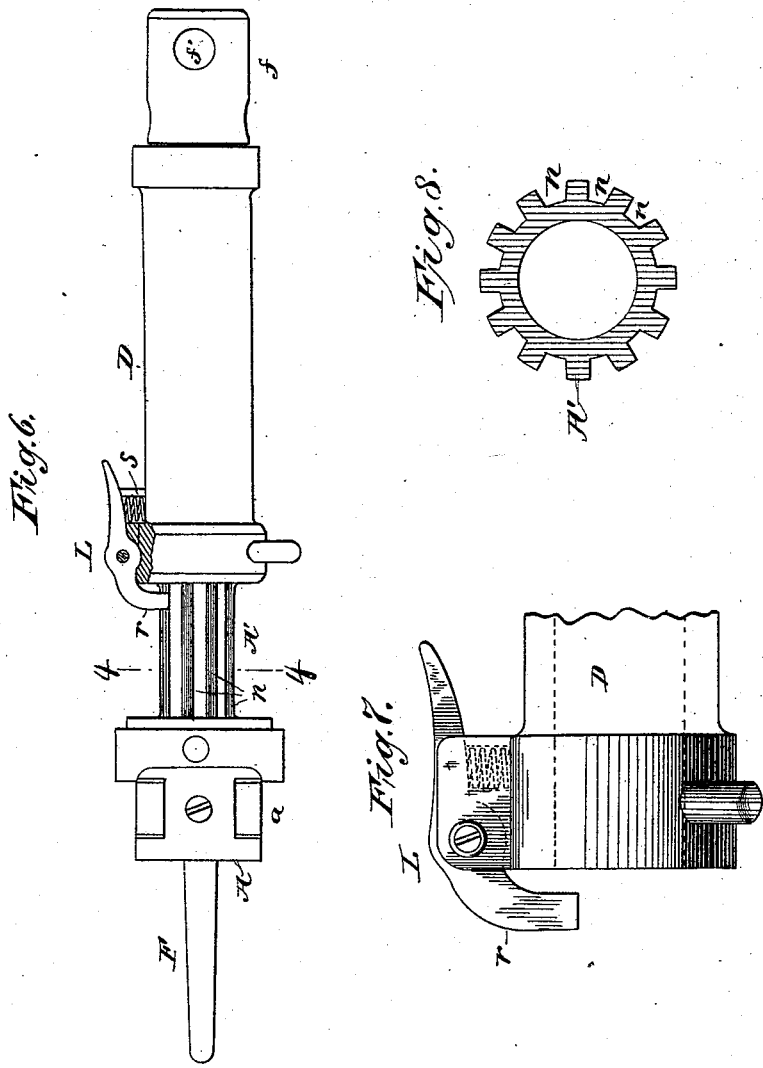
Attest:
C. M. Benjamin.
H. H. MacCord.
Inventor:
Orestes Pagan,
By W. F. Hapgood,
Atty

UNITED STATES PATENT OFFICE.

ORESTES PAGAN, OF PHILADELPHIA, PENNSYLVANIA.

TUBE-EXPANDER.

SPECIFICATION forming part of Letters Patent No. 471,678, dated March 29, 1892.

Application filed November 21, 1891. Serial No. 412,638. (No model.)

*To all whom it may concern:*

Be it known that I, ORESTES PAGAN, a citizen of the United States, residing at Philadelphia, in the county of Philadelphia and State of Pennsylvania, have invented certain new and useful Improvements in Boiler-Tube Expanders, of which the following is a specification.

In the expanders now in use the mandrel is driven in by means of a hammer, which, besides rapidly battering and destroying the tool, is a very irregular and uncertain means of applying the pressure upon the tubes, and it is practically impossible to get the same degree of expansion on two successive tubes. In some cases the mandrel is fed forward by a screw, and the entire tool is then revolved to effect the expansion of the tube; but in such tools the power required to turn them is very great and the friction of the rolls on the mandrel is liable to turn it and so constantly alter its position of feed.

The object of my invention is to provide a tool by which the force to drive the mandrel can be applied with exactness to any number of tubes and in a more convenient manner than by a hammer, and which requires less space and power to operate than other existing forms of expanders, and is not liable to have its adjustment accidentally altered while being operated, and I accomplish these objects by means of the mechanism shown in the accompanying drawings, wherein—

Figure 1 is a view of the complete tool. Fig. 2 is a longitudinal section. Fig. 3 is a transverse section through 1 1 in Fig. 2. Fig. 4 is a cross-section through 2 2, Fig. 2; and Fig. 5 is a cross-section at 3 3 in Fig. 2. Fig. 6 shows the tool provided with a catch for locking the feed mechanism at any position. Fig. 7 is an enlarged view of the latch in Fig. 6, and Fig. 8 is a cross-section through 4 4 of Fig. 6.

The expanding-head A is of a diameter to fit easily in the sized tube the tool is intended to be used on and of sufficient length for the average thickness of the tube-sheets in common use. This head carries three steel rollers $a\ a\ a$, which are loosely seated in a socket-piece $b$, fitted within the head A. Openings in the outer face of the head A and in the inner surface of $b$ allow the faces of the rolls $a\ a\ a$ to project somewhat outside the head and also into the inner opening, the rolls being greater in diameter than the combined thickness of the head A and socket $b$. Around the base of the head A is placed a flanged bearing-ring B, removably attached to A by screws or studs $c\ c$, fixed in A and engaging in the groove $c'''$ in the inner side of B. The end of the tube being expanded, which projects outside the tube-sheet, rests in this ring B in the slot $c''$, formed by the flange of the ring, and forms a guide to hold the head A at the proper depth within the tube. Portions of the flange $c'$ are cut away on opposite sides of the ring to allow of inspection of the work as it progresses. This is more clearly shown in Fig. 1. The shank A', made solid with the head A, has at its lower end a male screw-thread $d$, which engages with the female thread $d'$ within the body D. The mandrel F, tapered for about half its length, extends through the shank A and body D, and is connected with D by the cut ring $e$, which engages in the slot in F, formed by the collar $e'$ and the head $f$, the ring $e$ having a portion cut away to allow it to be slipped into the slot on F, and after the mandrel and ring have been inserted within the body D the ring $e$ is secured to D by the screws $e''$. A collar I, provided with a set-screw $i$, may be placed on the shank A', and may be adjusted to regulate the amount of expansion. Holes $f'$ are bored in the mandrel-head for inserting a bar to turn the mandrel, and bars $j\ j$ or other convenient handles are placed on D, by which to turn it and feed the mandrel forward.

In Fig. 6 I show a method of locking together the shank A' and the body D, so that any friction between the mandrel F and body D when operating the tool will not cause the latter to turn independent of A' and thus operate the feed mechanism when not intended. In this modification the shank A' has a number of longitudinal grooves $n\ n$ cut in it, while upon the body D is mounted the spring-latch L, with the downwardly-projecting nose $r$, which engages in one of the grooves $n\ n$, thus locking together the body D and shank A'. The spring $s$, under the opposite end of the latch, keeps the nose $r$ depressed and in engagement with one of the grooves n, as shown in Fig. 6, except when the latch is released for the purpose of feeding the mandrel forward or withdrawing it.

The operation of my improved expander is as follows: The tube to be expanded being in position in the tube-sheet with its end slightly projecting, the expander-head A, with the mandrel drawn in, as shown in Fig. 2, is inserted within the tube with the projecting end of the tube resting in the slot c' of the bearing-ring B. The body D is now screwed up on the shank A' by the bars j j, the latch L being at the same time released and held open by pressing down its handle end, carrying with it the mandrel F and driving its tapered end between the rolls a a a, and thus pressing the rolls outward and against the inside of the tube. The mandrel is now turned by a pin inserted in the holes in its head, and by its friction against the rolls a a a the latter are caused to revolve and, rolling around within the tube, press it out evenly all around. The mandrel is fed out a little at a time after every few revolutions have been given it until the tube has been sufficiently expanded, the operation being observed at the openings left in the bearing-ring B. When a number of tubes are to be expanded alike, the collar I is set against the forward end of D, as shown in Fig. 1, and fixed there by the set-screw, forming a guide in succeeding operations as to the distance the mandrel F shall be fed out. The collar I may, however, be omitted and the form of the latch L varied in construction without materially altering my invention.

By the above-described method of operating the mandrel a great power for rotating the rolls a a, and also the head, results from the application of a small force on the shank of the mandrel, and as the rolls a a move around within the tube undergoing expansion with a combined rolling and sliding motion the metal of the tube is thoroughly "spun" against the tube-plate, making a most perfect joint without injury to the metal.

What I claim, and desire to secure by Letters Patent, is—

1. In a tube-expander, the combination of the head A, provided with three or more rolls loosely seated therein of a greater diameter than the thickness of said head, so that their faces project somewhat beyond the sides of the head both without and within, the hollow shank A', provided with a male screw-thread d at its rear end for engagement with the body D, having a female thread on its inner face, and the tapered mandrel F, attached to the said body D by a swivel connection at its rear end and bearing against the inner faces of the rolls a a a at its other end, the said mandrel F and sleeve D being provided with means for revolving them, substantially as and for the purpose set forth.

2. In a roller-tube expander, the combination of the head A, provided with rolls a a a loosely seated therein, the bearing-ring B, provided with the interrupted flange c' and attached to A by a swivel movement formed by studs c c set in A and engaging in the groove c''' in the inner face of B, the hollow screw-shank A' and sleeve or feed-nut D, co-operating to feed the mandrel forward between the rolls a a a, and the tapered mandrel F, turning freely in the ring e, which is fixed in a recess in the base of D, substantially as described.

3. A tube-expander consisting of a hollow sleeve or shank A', carrying at one end the head A, provided with loosely-seated rolls a a a and having a screw-thread d at the other end, the hollow body D or feed-nut having a female screw on its inner surface which engages with the male thread d, and the tapered mandrel F, connected to the body D by a swivel-joint, in combination, substantially as described.

4. In a roller-tube expander, the combination of the longitudinally-grooved shank A', having at one end the head A, provided with the loosely-seated rolls a a a and at the other end the male screw d, the hollow body D, having in its inner surface a screw-thread engaging with the screw d, the spring-latch L with the downwardly-projecting nose r, engaging with the grooves in shank A', and the tapered mandrel F, turning independently in D by means of the swivel-joint formed by the split ring e, which is secured in a recess in the rear end of D and which engages in the circumferential groove in said mandrel, substantially as set forth.

ORESTES PAGAN.

Witnesses:
 JOS. F. GRIFFIN,
 CHAS. J. MILLER.